(12) United States Patent
Schlezinger et al.

(10) Patent No.: US 9,754,365 B2
(45) Date of Patent: Sep. 5, 2017

(54) WAFER INSPECTION METHOD AND SOFTWARE

(71) Applicant: Applied Materials, Inc., Santa Clara, CA (US)

(72) Inventors: Asaf Schlezinger, Sunnyvale, CA (US); Markus J. Stopper, Voerstetten (DE)

(73) Assignee: APPLIED MATERIALS, INC., Santa Clara, CA (US)

( * ) Notice: Subject to any disclaimer, the term of this patent is extended or adjusted under 35 U.S.C. 154(b) by 289 days.

(21) Appl. No.: 14/609,455

(22) Filed: Jan. 30, 2015

(65) Prior Publication Data
US 2015/0243009 A1    Aug. 27, 2015

Related U.S. Application Data
(60) Provisional application No. 61/943,186, filed on Feb. 21, 2014.

(51) Int. Cl.
| | |
|---|---|
| *G06K 9/00* | (2006.01) |
| *G06T 7/00* | (2017.01) |
| *G06T 17/10* | (2006.01) |
| *G06T 19/20* | (2011.01) |
| *G06T 17/00* | (2006.01) |

(52) U.S. Cl.
CPC ............. *G06T 7/001* (2013.01); *G06T 17/00* (2013.01); *G06T 17/10* (2013.01); *G06T 19/20* (2013.01); *G06T 2207/10052* (2013.01); *G06T 2207/30148* (2013.01); *G06T 2219/2012* (2013.01)

(58) Field of Classification Search
CPC ......... G06T 7/001; G06T 17/00; G06T 19/20; G06T 2207/10052; G06T 2219/2012
See application file for complete search history.

(56) References Cited

U.S. PATENT DOCUMENTS

| | | | | |
|---|---|---|---|---|
| 8,742,372 | B2 * | 6/2014 | Trupke | G01N 21/6489 |
| | | | | 250/459.1 |
| 9,200,779 | B2 * | 12/2015 | Levola | G02B 27/2285 |
| 9,341,580 | B2 * | 5/2016 | Schlezinger | H02S 50/00 |
| 2008/0160648 | A1 | 7/2008 | Sauar et al. | |
| 2011/0025839 | A1 | 2/2011 | Trupke et al. | |
| 2011/0188733 | A1 | 8/2011 | Bardos et al. | |
| 2011/0205339 | A1 * | 8/2011 | Pavani | G02B 21/16 |
| | | | | 348/46 |
| 2013/0129187 | A1 * | 5/2013 | Maxwell | G01N 21/95 |
| | | | | 382/141 |

(Continued)

FOREIGN PATENT DOCUMENTS

KR    10-2011-0095091 A    8/2011

OTHER PUBLICATIONS

International Search Report and Written Opinion from related application PCT/US2015/014846 dated May 15, 2015.

*Primary Examiner* — Gregory M Desire
(74) *Attorney, Agent, or Firm* — Patterson + Sheridan LLP

(57) ABSTRACT

Embodiments of the present invention generally relate to methods for inspecting wafers. After a brick is sliced into a plurality of bare wafers, a two-dimensional (2D) photoluminescence (PL) image of each wafer is taken, the PL images of the wafers in sequential order (i.e., the sequence of the wafers as they are sliced from the brick) are then combined to construct a three-dimensional (3D) model of the brick that highlights similar regions in the brick.

20 Claims, 3 Drawing Sheets

(56) References Cited

U.S. PATENT DOCUMENTS

2015/0243009 A1* 8/2015 Schlezinger ............ G06T 17/00
　　　　　　　　　　　　　　　　　　　　　382/145
2015/0377796 A1* 12/2015 Schlezinger ............ H02S 50/00
　　　　　　　　　　　　　　　　　　　　　356/72

* cited by examiner

WAFER INSPECTION METHOD AND SOFTWARE

CROSS-REFERENCE TO RELATED APPLICATIONS

This application claims priority to U.S. Provisional Patent Application Ser. No. 61/943,186, filed on Feb. 21, 2014, which is incorporated by reference in its entirety.

BACKGROUND

Field

Embodiments of the present invention generally relate to methods for inspecting semiconductor and solar wafers.

Description of the Related Art

Photovoltaic (PV) devices or solar cells are devices which convert sunlight into direct current (DC) electrical power. One approach of forming the solar cells is to slice a multi-crystalline brick into hundreds of thin bare wafers, and to process the bare wafers to form the solar cells. The bare wafers may be inspected for defects such as dislocations or impurities. The less defects the bare wafers have, the more efficient the finished solar cell will be. However, the current inspection method cannot provide useful information about defects to the brick or bare wafer producers, so the producers can improve the quality of the bricks/wafers.

Therefore, there is a need for an improved method for providing wafer producers useful information regarding defects in the bricks/wafers.

SUMMARY

Embodiments of the present invention generally relate to methods for inspecting wafers. After a brick is sliced into a plurality of bare wafers, a two-dimensional (2D) photoluminescence (PL) image of each wafer is taken, and the PL images of the wafers are then combined in sequential order (i.e., the sequence of the wafers as they are sliced from the brick) to construct a three-dimensional (3D) model of the brick.

In one embodiment, a method for inspecting wafers is disclosed. The method includes combining 2D PL images of each wafer of a plurality of wafers, where the images of the plurality of wafers are combined in a sequential order corresponding to a position of each wafer in a brick prior to slicing of the brick. The method further includes constructing a 3D PL model of the brick highlighting similar regions within the brick.

In another embodiment, a method includes slicing a brick to form a plurality of wafers, taking a two-dimensional photoluminescence image of each wafer of the plurality of wafers, sorting the two-dimensional photoluminescence images of the wafers in sequential order, combining the sequential two-dimensional photoluminescence images, and constructing a three-dimensional photoluminescence model of the brick

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the present invention generally relate to methods for inspecting wafers. After a brick is sliced into a plurality of bare wafers, a 2D PL image of each wafer is taken, the PL images of the wafers in sequential order are then combined to construct a 3D model of the brick.

Figure 1:
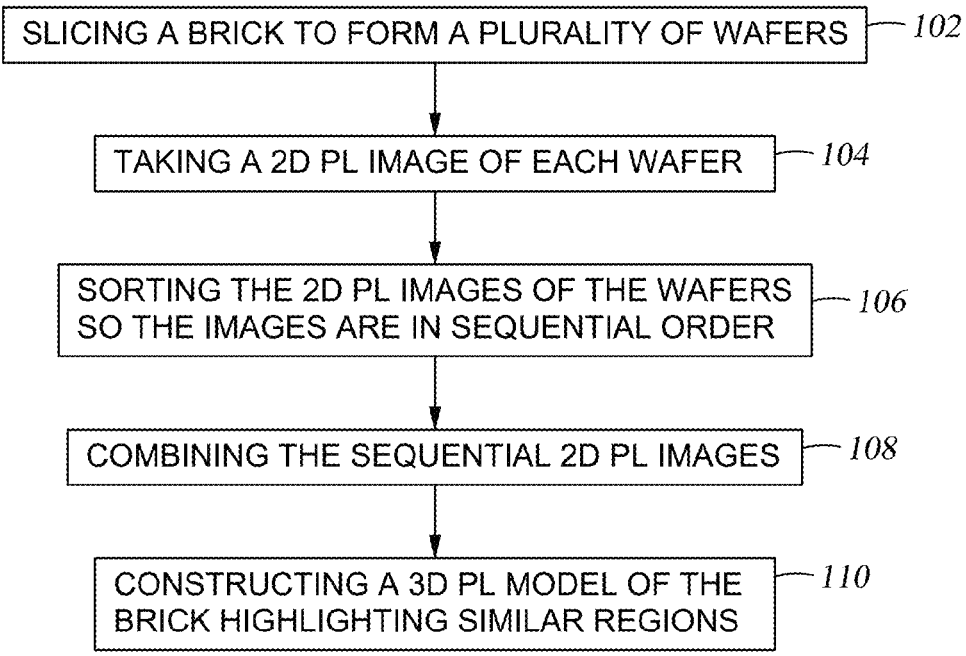
FIG. 1 is a flow chart showing a method for inspecting wafers according to one embodiment.

FIG. 1 is a flow chart 100 showing a method for inspecting wafers according to one embodiment. At block 102, a brick is sliced into a plurality of thin wafers. The brick may be a multi-crystalline or mono-crystalline silicon brick having a cuboid shape. The silicon brick may have a length of about 144 mm (mono-crystalline) or 156 mm (multi-crystalline), a width of about 144 mm or 156 mm and a height of about 500 mm or more. The slicing is along the height of the brick, thus each wafer has a length of about 144 mm or 156 mm, a width of about 144 mm or 156 mm and a thickness that is based on a desired end use. In one embodiment, each wafer is about 200 microns thick. The sum of the thicknesses of all the wafers from the brick may not equal to the height of the brick due to kerf loss as a result of slicing. Kerf is referring to the area between adjacent wafers prior to slicing the brick. The amount of kerf is dependent on the slicing technology. In one embodiment, the kerf loss is about 100 microns per slice.

Figure 2:
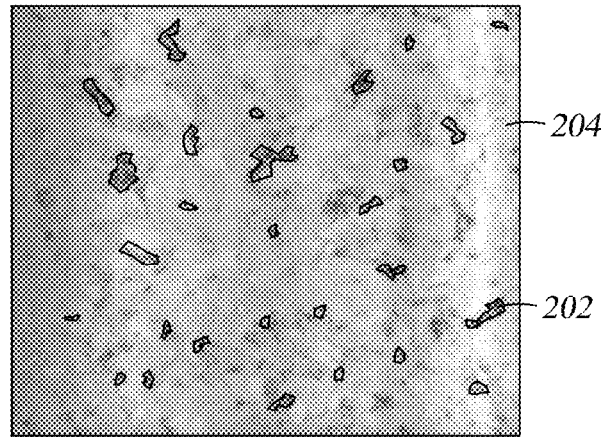
FIG. 2 is a two-dimensional photoluminescence image of a wafer according to one embodiment.

At block 104, a 2D PL image of each wafer is taken. PL is the light emitted by a semiconductor material in response to optical excitation. The 2D PL image may be taken by inducing PL simultaneously across a surface of the wafer, such as the surface having a length of about 144 mm or 156 mm and a width of about 144 mm or 156 mm. PL may be induced by a light source, such as a laser beam. The laser beam may pass a collimator and/or a homogenizer before reaching the surface of the wafer. The image of the induced PL may be captured by any suitable image capture device, such as a line scan camera. A filter may be disposed between the surface of the wafer and the camera. A 2D PL image 200 of a wafer is shown in FIG. 2. The 2D PL image 200 may have similar regions 202 (dark) and 204 (light). The dark regions 202 may represent defects in the wafer, such as a dislocation clusters, impurities or grain boundaries. However, the 2D PL images cannot provide information such as the starting point and the ending point of the defect within a brick.

The wafers from a single brick may be sequentially placed on a transportation device, which carries the wafers through an inspection module where a 2D PL image is taken for each wafer. Sequentially means the wafers are in an order corresponding to their positions in the brick prior to slicing the brick. If this is the case, block 106 may not be necessary. However, if the wafers are not carried sequentially through the inspection module, the 2D PL images of the wafers may be sorted so the images are in sequential order. To be able to sort the images, the wafers may be labeled with their respective positions in the brick prior to slicing.

At block 108, the sequential 2D PL images are combined to construct a 3D PL model of the brick, as shown in block 110. The combining of the sequential 2D PL images and the constructing of the 3D PL model may be performed by a image process package, such as Fiji. When combining the 2D PL images, the defective areas, such as the dark regions 202 shown in FIG. 2, of all the wafers from the brick are better defined in the direction corresponding to the height of the brick. Since there is some kerf loss, some extrapolation may be performed to represent the original brick.

Figure 3A:
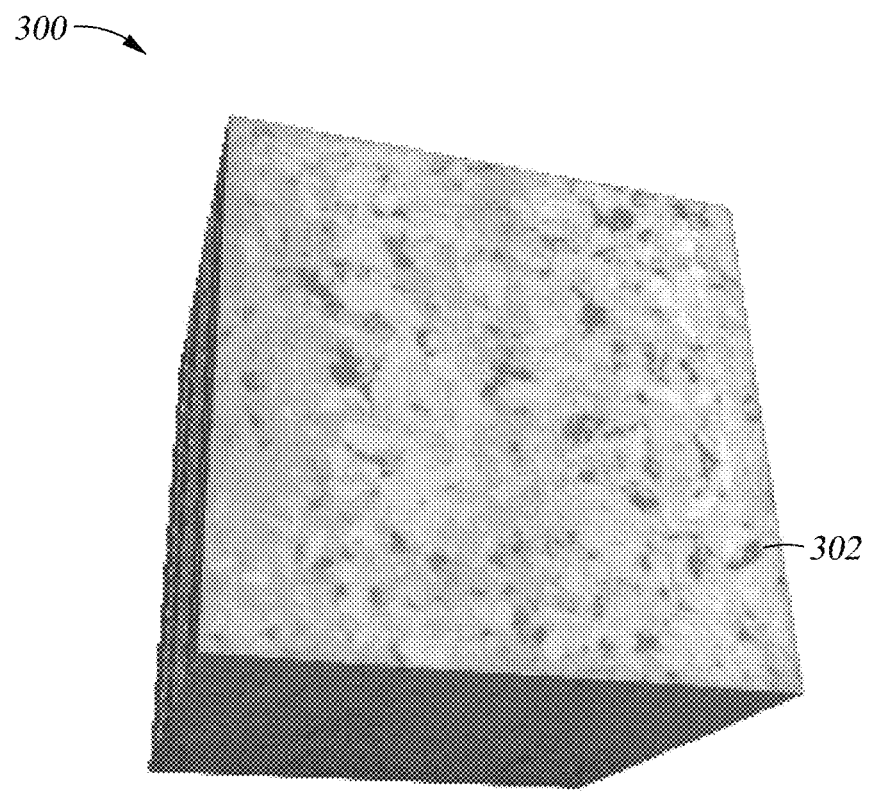
FIGS. 3A-3B show three-dimensional photoluminescence models of a brick according to one embodiment.
Figure 3B:
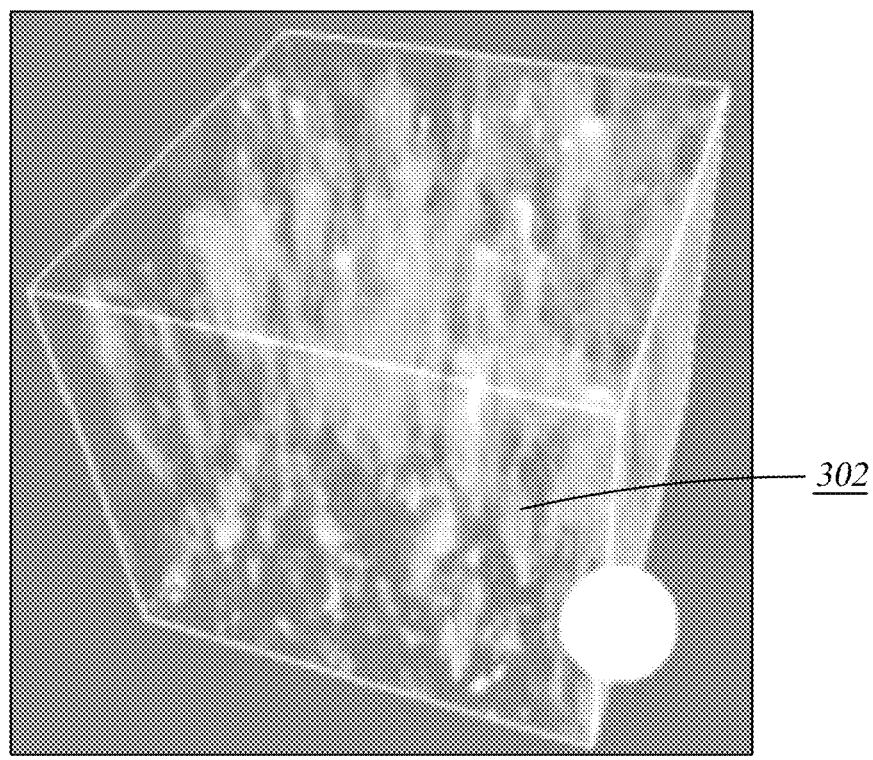

FIG. 3A shows an example of the 3D PL model 300 of a brick. In addition to showing the surface areas of the brick, as shown in FIG. 3A, the 3D PL model highlights the areas of interest that have similar regions within the brick. FIG. 3B highlights the inside of the brick after removing areas that are not of interest, leaving similar regions that are areas of interest 302. The areas of interest 302 may highlight a defect such as dislocation clusters or impurities, and the 3D PL model provides information such as the starting point of the defect and the ending point of the defect. Other methods of highlighting may be utilized, such as using different colors.

The information provided by the 3D PL model of the brick may be used to improve the quality of the bricks/wafers. In one embodiment, an inspection tool that takes 2D PL images is disposed downstream of a wafer production line. At the upstream of the wafer production line, the multi-crystalline silicon brick is formed and sliced into thin wafers. By performing the method described above, the quality of the multi-crystalline silicon brick and in turn the wafers may be improved using the information provided by the 3D PL model of the brick. A brick may go through a post-formation treatment, such as laser annealing, to have the defects corrected based on the 3D PL model of a previously formed brick under the same processing conditions. Alternatively, the brick formation process parameters may be adjusted based on the 3D PL model of a brick to minimize the defects in bricks to be formed.

While the foregoing is directed to embodiments of the present invention, other and further embodiments of the invention may be devised without departing from the basic scope thereof, and the scope thereof is determined by the claims that follow.

The invention claimed is:

1. A method for inspecting wafers, comprising:
combining two-dimensional photoluminescence images of each wafer of a plurality of wafers, wherein the images of the plurality of wafers are combined in sequential order corresponding to a position of each wafer in a brick prior to slicing of the brick; and
constructing a three-dimensional photoluminescence model of the brick highlighting similar regions within the brick, wherein the three-dimensional photoluminescence model is constructed from combining the two-dimensional photoluminescence images in sequential order.

2. The method of claim 1, wherein the brick has a length of about 144 mm, a width of about 144 mm and a height of about 500 mm or more.

3. The method of claim 2, wherein each wafer of the plurality of wafers has a length of about 144 mm, a width of about 144 mm and a thickness of about 200 microns.

4. The method of claim 1, wherein the brick has a length of about 156 mm, a width of about 156 mm and a height of about 500 mm or more.

5. The method of claim 4, wherein each wafer of the plurality of wafers has a length of about 156 mm, a width of about 156 mm and a thickness of about 200 microns.

6. The method of claim 1, further comprising forming the plurality of wafers by slicing the brick.

7. The method of claim 6, further comprising taking the two-dimensional photoluminescence image of each wafer.

8. The method of claim 7, wherein the taking the two-dimensional photoluminescence image of each wafer comprises inducing photoluminescence across a surface of the wafer by a light source.

9. The method of claim 8, wherein the light source is a laser.

10. The method of claim 1, wherein the similar regions represent defects.

11. A method, comprising:
slicing a brick to form a plurality of wafers;
taking a two-dimensional photoluminescence image of each wafer of the plurality of wafers;
sorting the two-dimensional photoluminescence images of the wafers in sequential order to produce sequential two-dimensional photoluminescence images;
combining the sequential two-dimensional photoluminescence images; and
constructing a three-dimensional photoluminescence model of the brick, wherein the three-dimensional photoluminescence model is constructed from combining the sequential two-dimensional photoluminescence images.

12. The method of claim 11, wherein the brick has a length of about 144 mm, a width of about 144 mm and a height of about 500 mm or more.

13. The method of claim 12, wherein each wafer of the plurality of wafers has a length of about 144 mm, a width of about 144 mm and a thickness of about 200 microns.

14. The method of claim 11, wherein the brick has a length of about 156 mm, a width of about 156 mm and a height of about 500 mm or more.

15. The method of claim 14, wherein each wafer of the plurality of wafers has a length of about 156 mm, a width of about 156 mm and a thickness of about 200 microns.

16. The method of claim 11, wherein the taking the two-dimensional photoluminescence image of each wafer comprises inducing photoluminescence across a surface of the wafer by a light source.

17. The method of claim 16, wherein the light source is a laser.

18. The method of claim 11, further comprising highlighting similar regions within the three-dimensional photoluminescence model, wherein the similar regions represent defects.

19. The method of claim 18, further comprising treating a subsequent brick based on the three-dimensional photoluminescence model of the brick, wherein the brick and the subsequent brick are formed under same process conditions.

20. The method of claim 19, wherein treating the subsequent brick comprises laser annealing.

* * * * *